(12) United States Patent
Morris et al.

(10) Patent No.: US 10,891,290 B2
(45) Date of Patent: Jan. 12, 2021

(54) QUERY PLAN SEARCHING AND OPTIMIZATION

(71) Applicant: Teradata US, Inc., Dayton, OH (US)

(72) Inventors: John Mark Morris, Escondido, CA (US); Bhashyam Ramesh, Secunderabad (IN); Donald Raymond Pederson, San Diego, CA (US); Kuorong Chiang, Buena Park, CA (US)

(73) Assignee: Teradata US, Inc., San Diego, CA (US)

( * ) Notice: Subject to any disclaimer, the term of this patent is extended or adjusted under 35 U.S.C. 154(b) by 440 days.

(21) Appl. No.: 15/852,597

(22) Filed: Dec. 22, 2017

(65) Prior Publication Data

US 2019/0197163 A1 Jun. 27, 2019

(51) Int. Cl.
*G06F 16/00* (2019.01)
*G06F 16/2453* (2019.01)

(52) U.S. Cl.
CPC .. *G06F 16/24545* (2019.01); *G06F 16/24542* (2019.01)

(58) Field of Classification Search
None
See application file for complete search history.

(56) References Cited

U.S. PATENT DOCUMENTS

| | | | | |
|---|---|---|---|---|
| 5,255,181 A * | 10/1993 | Chapman | ............... | G06Q 10/06 705/7.25 |
| 8,335,767 B2 * | 12/2012 | Das | .................. | G06F 16/24542 707/661 |
| 8,346,761 B2 * | 1/2013 | Muras | ................. | G06F 16/2462 707/721 |
| 8,356,027 B2 | 1/2013 | Jaecksch et al. | | |
| 8,601,474 B2 * | 12/2013 | Konik | ................. | G06F 9/45558 718/1 |
| 9,128,984 B2 | 9/2015 | Weiner et al. | | |
| 9,279,979 B2 * | 3/2016 | Yokoyama | ........... | G02B 26/105 |
| 2012/0179669 A1 * | 7/2012 | Al-Omari | ......... | G06F 16/24524 707/719 |
| 2014/0114952 A1 * | 4/2014 | Robinson | .......... | G06F 16/24532 707/718 |
| 2017/0212932 A1 | 7/2017 | Browne | | |
| 2017/0351735 A1 | 12/2017 | Nicolas et al. | | |
| 2018/0060395 A1 * | 3/2018 | Pathak | .................. | G06F 9/5061 |

* cited by examiner

*Primary Examiner* — Debbie M Le
(74) *Attorney, Agent, or Firm* — Schwegman, Lundberg & Woessner, P.A.; Howard Speight

(57) ABSTRACT

Search spaces for obtaining query execution plans for a query are identified. The search spaces are subdivided into sub-search spaces. Searches are initiated within the sub search spaces and plan costs for competing query execution plans are noted along with search costs associated with continuing to search the sub-search spaces. A decision is made based on the plan costs and search costs for utilizing search resources as to when to terminate the searching and to select the then-existing lowest cost query execution plan as an optimal query execution plan for executing the query.

19 Claims, 4 Drawing Sheets

QUERY PLAN SEARCHING AND OPTIMIZATION

BACKGROUND

A distributed data warehouse includes voluminous amounts of data and resources. Some queries that are executed can take a significant amount of elapsed time to complete and tax a number of the resources. Consequently, conventional databases include an optimizer that produces query instructions for a query in an execution plan for purposes of executing the query in the most cost-effective and time-efficient manner given the resources of the database. Once the plan is selected, the query instructions are provided to one or more database engines for executing against the database in accordance with the selected plan.

In a traditional optimizer plan space search, the optimizer typically includes a proscribed and deterministic search strategy that is: time-based, depth-based, plan-type based, or a combination of these approaches. The cost of each plan is estimated and compared to the lowest cost plan found so far in the search.

A number of practical issues circumscribe traditional plan search space and selection techniques. Such issues include the duration of the search needed for selecting the optimal plan and the resources used by the search, which is often expressed relative to the duration of the query and the resources used by the query. That is, when the elapsed time for finding an optimal plan to execute a query exceeds the time and resources needed to execute the query, the technique for searching for the optimal plan is a bottleneck.

Furthermore, as execution capabilities increase such as with: improvements in table join techniques, newer forms of access techniques, newer forms of execution techniques (e.g., vectorized), the search space exponentially increases, which means the traditional approaches are ill-equipped for searching these ever-growing search spaces.

Therefore, there is a need for improved query plan searching and optimization.

SUMMARY

Methods and a system for query plan searching and optimization are presented.

In an embodiment, a method for query plan searching and optimization is provided. Search spaces are identified for providing query execution plans for a query. The search spaces are subdivided into sub-search spaces. Plan costs being developed from the resources of the sub-search spaces for the query execution plans are obtained. Resource costs associated with using and continuing to utilize the resources are maintained. Finally, an optimal query execution plan is selected from the query execution plans based on the plan costs and the resource costs.

DETAILED DESCRIPTION

Various embodiments depicted herein are implemented as one or more software modules, which are programmed within memory and/or non-transitory computer-readable storage media and executed on one or more processing devices (having memory, storage, network connections, one or more processors, etc.).

As used herein, the terms and phrases "database," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse").

As used herein a "processing unit" is a distributed database engine that executes instructions on a network node device of the processing unit. Multiple distributed processing units are provided for executing database instructions in parallel over a network. The phrase "processing unit" may be used interchangeable and synonymously with the phrase "Access Module Processor (AMP)."

As used herein, a "resource" can be a hardware resource or a software resource, such as a software program, a data file, a data table, or various combinations of hardware and software resources.

As used herein, a "search space" is one or more resources in a same processing environment or one or more resources in multiple processing environments.

A novel processing technique is provided for optimally searching for the most-cost effective (optimal) query execution plan for execution by the data warehouse. This is done through identifying and evaluating the available search spaces for finding the optimal plan with dynamica adjustment based on processing costs associated with continuing a search for the optimal plan.

Figure 1:
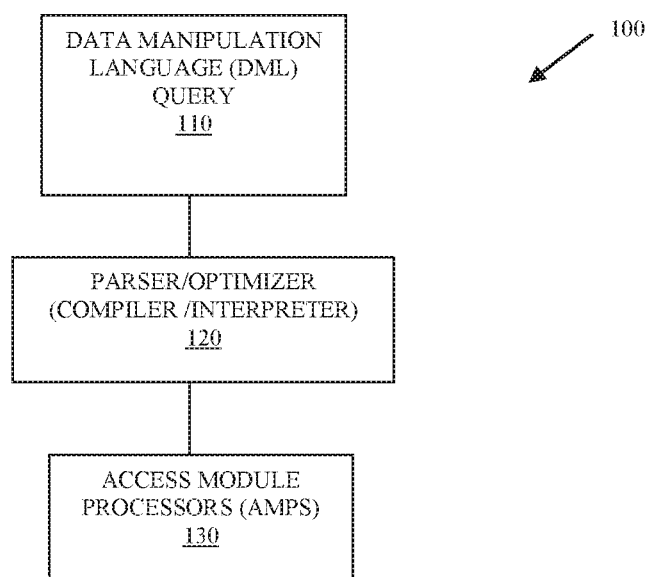
FIG. 1 is a diagram of a system for a distributed data warehouse, according to an embodiment.

FIG. 1 is a diagram of a system 100 for a distributed data warehouse, according to an embodiment.

The system 100 is shown in greatly simplified form with just those components necessary for comprehension of embodiments of the invention presented. It is to be understood that additional components or subcomponents may be used without departing from the teachings presented herein.

The system 100 includes a Data Manipulation Language (DML) (such as Structured Query Language (SQL)) query 110 (herein after just "query 110" a parser/optimizer (compiler/interpreter) 120 (herein after just "optimizer 102"), and Access Module Processors (AMPS) 130—that execute instructions against the database—the processing units or database engines).

The query 110 can be issued and/or originate from an automated process (application or script) within the warehouse/database (such as through schedule reports, etc.) or can be issued and/or originate from an end-user (such as a Database Administrator (DBA) or Data Analyst) through a user-interface to the warehouse/database.

The optimizer 120 translates or interrupts the query 110 into a set of optimal instructions that the AMPs 130 process against the warehouse. Multiple query execution plans are typically produced by the optimizer 120 and the optimizer selects an optimal (least-cost) plan for execution.

The optimizer 120, then, provides the query instructions in accordance with the selected plan to the AMPs 130, each AMP 130 process instructions against tables that are assigned to that AMP 130.

The query plan searching and optimization techniques are implemented as one or more executable instructions as enhancements to the optimizer 120.

The technique provided herein provide improved methods for intelligent query plan searching and selecting.

Initially, the plan search spaces are determined, which may be all or a portion of the total possible plans that the optimizer 120 or multiple instances of the optimizer can produce. The plan spaces includes various join orders permitted in the query 110, join kinds, and indexes used including join indexes, as well as other techniques. There are many ways to identify plan search spaces.

For example, identification of the available locations for which to search for an optimal query plan of a query 110 can be based on the plans produced by the optimizer(s) 120 and execution characteristics. As one example, the search space may be identified by a greedy algorithm where a problem solving heuristic selects an optimal choice at each stage of the problem with the expectation that final plan is the optimal plan. Another technique may be to focus on those plans that have particular execution characteristics, such as larger number of preferred join methods or execution techniques; the focus being on the portions of the query 110 that is believed to be the most expensive components of the query 110. Additional techniques can include random, entropic, genetic, and/or Monte-Carlo (simulation technique using randomness and determinism through a statistical-based approach). Still another technique may be based on user characteristics, such as those that exhibit user-specific query plan fragments.

Any selected search space identification technique is augmented with machine-learning based on experience obtained with previous plan searching and execution. Additionally, some of the identified plan search spaces may overlap; however, repeated evaluation is costly, therefore, a process is applied to detect overlapping search spaces that were identified to avoid re-evaluation of the query plans in the overlapping search spaces.

The identified query plan search spaces (S) are then subdivided into a number of search subspaces (s) that may be larger (typical), equal, or lesser than the search parallelism P. There may be different mechanisms implemented to determine the subspaces.

In an embodiment, the search subspaces are ordered and/or prioritized based on criteria that determines the scheduling order on parallel threads. The criteria may be determined based on results from machine-learning with respect to previous query plan searching and optimal query execution plan selection. This allows, the most-likely sub-search spaces to produce a most-likely optimal query execution plan to execute first and is especially useful when the sub-search spaces are not executed in parallel or when parallelism is not used.

An efficient process is provided for the parallel search threads to observe the current lowest cost plan identified with cost (c) (it is noted that costs can be determined from the database statistics associated with the warehouse's resources and query resources). If all search threads are contained within a single server, which is typical, then the lowest cost (c) can be stored atomically in a global variable. Each search thread discards each plan that calculates to a cost equal or greater than c. In an embodiment, if the intermediate cost equals or exceeds c, the partially costed plan may be immediately discarded. As each search thread finishes the examination of a subspace, if there are more subspaces to search, it will do so.

Furthermore, the number of parallel threads need not be constant. An algorithm may vary the search parallelism as a function of search elapsed time, total search resources, the current lowest cost plan, and the estimated query duration for the current low cost plan.

The elapsed time of the parallel search is measured.

In an embodiment, the total search resources used are measured and expressed in the same units as plan cost.

In an embodiment, the user provides input (via global or session setting or query band) that determines the investment they are willing to make in search cost and/or duration relative to the best identified plan cost and/or duration. The user may also provide directives on the minimum and/or maximum search parallelism.

In an embodiment, an algorithm evaluates search elapsed time, total search resources, the current lowest cost plan, and the estimated query duration for the current low cost plan to make a decision, based on user preferences, whether to terminate the search prior to exhausting the determined search space.

In an embodiment, a non-optimized or quickly optimized plan meeting a cost threshold t may optionally begin execution in parallel while deeper optimization continues on other aspects of the query 110. As time progresses and resource usage accumulates for the running thread and the ongoing optimization, threshold cost and sunk cost based decisions can be made to determine whether the executing query 110 should continue and/or whether the ongoing optimization processes should continue.

As an example of the query plan searching and optimization consider the following for an example query 110:

A query is received for optimization.

The plan search space is divided into 100 subspaces.

7 search spaces are identified as likely to lead to a low cost plan based on heuristics. These search spaces may be narrowly defined based on the typically chosen plans. These special search spaces may overlap with other subspaces.

12 search threads are initiated, 7 of which are the special search subspaces.

One of the 7 special spaces produces a low cost plan p of cost c.

With 61 subspaces examined in duration d and search cost j, the lowest cost plan remains plan p with cost c and estimated duration e.

A user setting has determined that plan search should continue until both $10*d>e$ and $100*j>c$, for example.

An algorithm evaluates (d, j, c, e), based on the user preferred setting, that the d and j relative to e and c, respectively, comprise a sufficient investment and that the query search should be terminated and execution should be scheduled. In other words, the lowest cost plan identified at that point in the search is deemed to be good enough based on the duration and resources spent on the search.

It is to be noted that although the novel query plan searching and optimizations was discussed with respect to parallelism, such does not have to always be the case. That is, the novel processing can also execute serially on a single thread. In other words, dividing search space is well suited for parallelism but does not mean such an approach cannot work equally well with non-parallelism.

These and other embodiments are now discussed with reference to the FIGS. 2-4.

Figure 2:
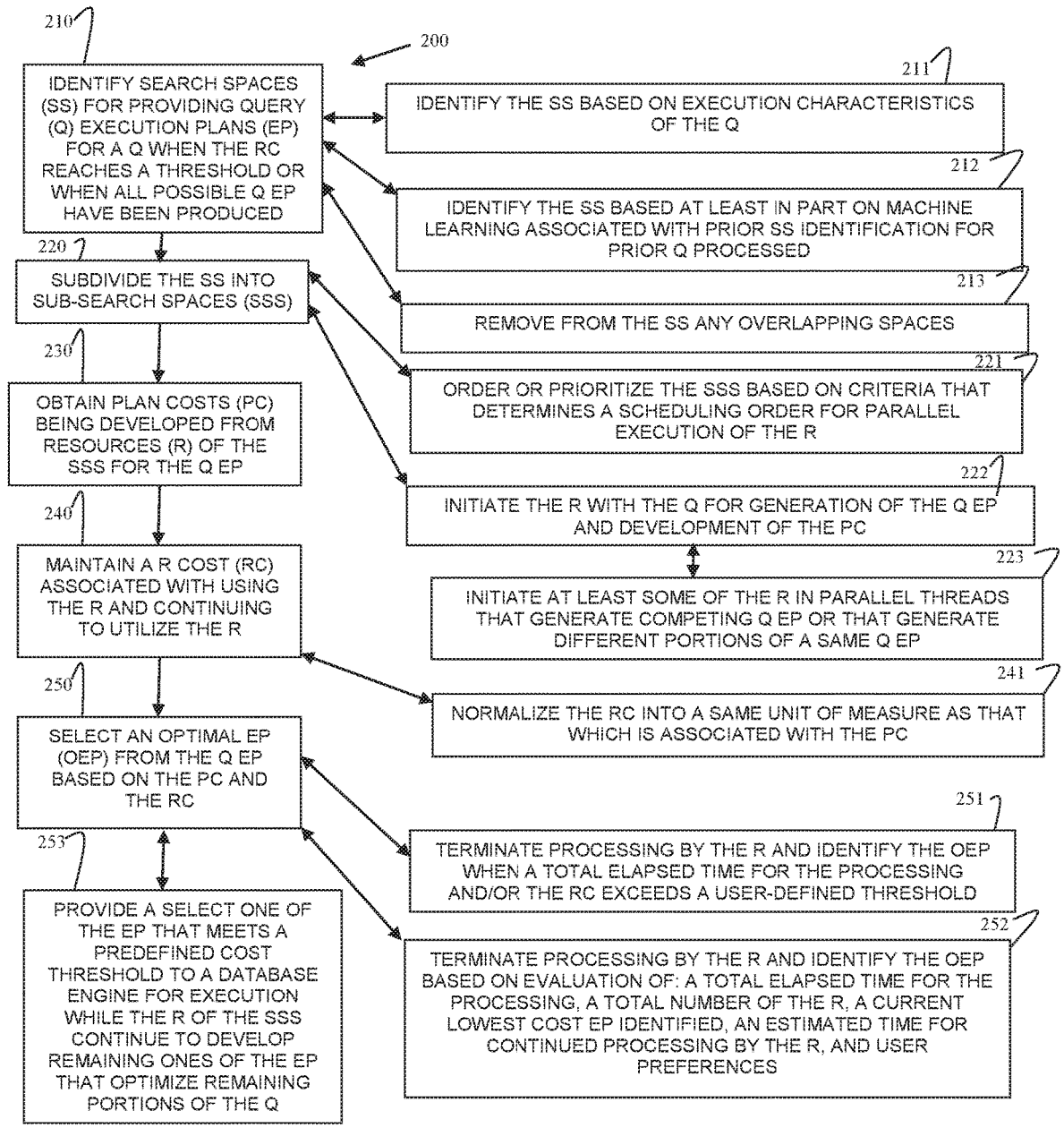
FIG. 2 is a diagram of a method for query plan searching and optimization, according to an example embodiment.

FIG. 2 is a diagram of a method 200 for query plan searching and optimization, according to an example embodiment. The method 200 is implemented as one or more software modules referred to as a "query plan searcher"). The query plan searcher is executable instructions that are programmed within memory or a non-transitory computer-readable medium and executed by one or more hardware processors. The query plan searcher has access to one or more network connections during processing, which can be wired, wireless, or a combination of wired and wireless.

In an embodiment, the query plan searcher is implemented within a data warehouse across one or more physical devices or nodes (computing devices) for execution over a network connection.

In an embodiment, the query plan searcher is the optimizer 120 with the enhanced processing discussed above with the FIG. 1.

At 210, the query plan searcher identifies search spaces for providing query execution plans for a query. That is, sets of resources (a set can include 1) that are in a same processing environment or that span multiple different processing environments are identified for processing the query or a portion of the query and providing query execution plans and costs (provided in database statistics for the database resources). In an embodiment, the search resources can be independent processing instances of a database optimizer or services utilized by instances of database optimizers.

In an embodiment, at 211, the query plan searcher identifies the search spaces based on execution characteristics of the query (this was discussed above with the FIG. 1).

In an embodiment, at 212, the query plan searcher identifies the search spaces based at least in part on machine learning associated with prior search space identification for prior queries processed by the query plan searcher. That is, the query plan searcher learns the best techniques for identifying the search spaces based on prior results and prior identifications of the search spaces processed for previously submitted queries.

In an embodiment, at 213, the query plan searcher removes from the search spaces overlapping spaces. That is, a same resource performing a same portion of the query execution plan generation identified in two different search spaces can be removed and utilized just once to avoid duplicative processing.

At 220, the query plan searcher subdivides the search spaces into sub-search spaces. This can be done in a variety of manners as identified above with the discussion of the FIG. 1.

In an embodiment, at 221, the query plan searcher orders or prioritizes the sub-search spaces based on criteria that determines a scheduling order for parallel execution by the search resources.

In an embodiment, at 222, the query plan searcher initiates the search resources with the query for generation of the query execution plans and development of plan costs (based on the database statistics).

In an embodiment of 222 and at 223, the query plan searcher initiates at least some of the search resources in parallel threads that generate competing query execution plans or complimentary different portions of a same query execution plan.

At 230, the query plan searcher obtains dynamic accumulating plan costs being developed from the search resources of the sub-search spaces for the query execution plans that are being produced by those search resources.

At 240, the query plan searcher maintains a running total resource cost that is associated with using (processing) the search resources. The running total including estimated remaining costs for continuing to utilize the search resources in generating the query execution plans.

According to an embodiment, at 241, the query plan searcher normalizes the resource cost into a same unit of measure that is associated with the plan costs. This permits programmatic comparison between the resource cost and the plan costs.

At 250, the query plan searcher selects an optimal query execution plan from the query execution plans based at least in part on the current received plan costs when the resource cost reaches a threshold or when all possible query execution plans have been produced by the search resources.

In an embodiment, at 251, the query plan searcher terminates processing of the search resources for completing production of the query execution plans when a total elapsed processing time for the query plan searcher and/or the resource cost exceeds a user-defined threshold value. The query plan searcher then selects the optimal query execution plan as the then-lowest cost query execution plan that has been received from the search resources.

In an embodiment, at 252, the query plan searcher terminates processing of the search resources for completing production of the query execution plans and identifies the optimal query execution plan based on evaluation of: a total elapsed processing time for the query plan searcher, a total number of the search resources, a current lowest cost query execution plan identified at that point in time, an estimated time for continuing to process and produce remaining ones of the query execution plans, and user-defined preferences.

In an embodiment, at 253, the query plan searcher provides a select one of the query execution plans that meets a predefined cost threshold to a database engine (AMP 130) for execution in parallel while the resources of the sub-search spaces continue to develop remaining ones of the query execution plans for purposes of optimizing remaining portions of the query execution.

Figure 3:
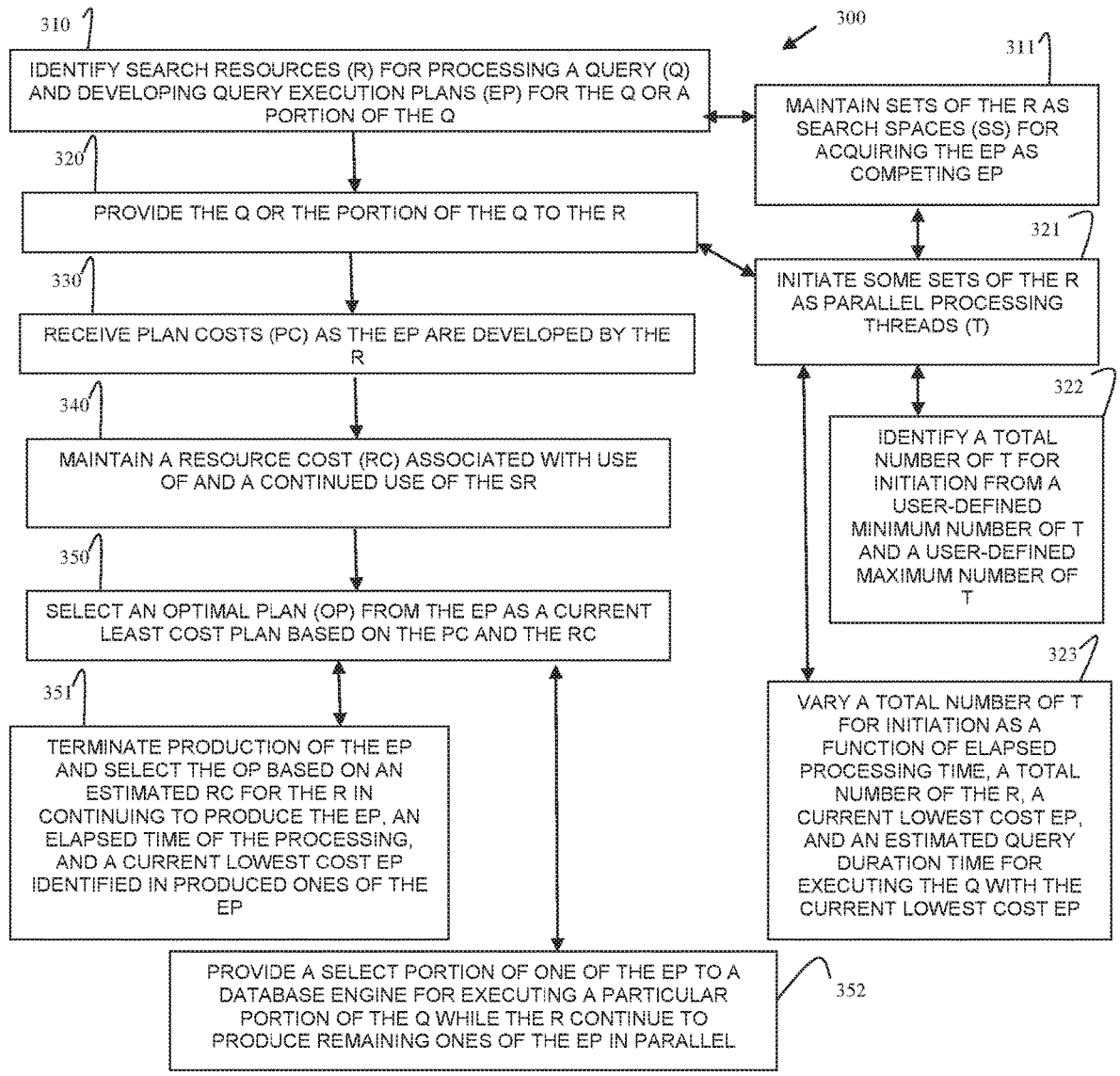
FIG. 3 is a diagram of another method for query plan searching and optimization, according to an example embodiment.

FIG. 3 is a diagram of another method 300 for query plan searching and optimization, according to an example embodiment. The method 300 is implemented as one or more software modules referred to as a "query plan resolver." The query plan resolver is executable instructions that are programmed within memory or a non-transitory computer-readable medium and executed by one or more hardware processors. The query plan resolver has access to one or more network connections during processing, which can be wired, wireless, or a combination of wired and wireless.

The query plan resolver presents another and in some ways enhanced perspective of the processing discussed above with the FIG. 1.

In an embodiment, the query plan resolver is all or some combination of: the optimizer 120 and/or the method 200.

At 310, the query plan resolver identifies search resources for processing a query and developing query execution plans for the query or some portion of the query.

In an embodiment, at 311, the query plan resolver maintains sets or groups of the resources (a set or a group can include a single resource) as search spaces for acquiring (searching for) the query execution plans as competing query execution plans or in some cases complimentary query execution plans, each complimentary query execution plan representing a different aspect or portion of the query.

At 320, the query plan resolver provides the query or the portion of the query to the search resources.

In an embodiment of 311 and 320, at 321, the query plan resolver initiates some sets of the search resources as parallel processing threads that execution in parallel to one another.

In an embodiment of 321 and at 322, the query plan resolver identifies a total number of the parallel processing threads for initiation from a user-defined minimum number of threads and a user-defined maximum number of threads.

In an embodiment of 321 and at 323, the query plan resolver dynamically varies a total number of the parallel processing threads that are processing at any point in time as a function of: a total number of search resources, a current lowest cost query execution plan, and an estimated query execution duration time for executing the query with the current lowest cost query execution plan.

At 330, the query plan resolver receives plan costs dynamically as the query execution plans are being developed by the search resources.

At 340, the query plan resolver maintains a running total for a search resource cost that is associated with using (processing) the search resources and continuing to utilize the search resources to finish developing all of the possible query execution plans.

At 350, the query plan resolver selects an optimal query execution plan from the then-existing query execution plans as a current least cost plan based on the plan costs and the resource cost.

In an embodiment, at 351, the query plan resolver terminates production of the query execution plans and selects the optimal query execution plan based on an estimated search resource cost for the resources in continuing to produce the query execution plans, and elapsed time that as elapsed when processing the query plan resolver, and a current lowest cost query execution plan identified in produced ones of the query execution plans.

In an embodiment, at 352, the query plan resolver provides a select portion of one of the query execution plans to a database engine (AMP 130) for executing a particular portion of the query while the search resources continue to produce the query execution plans in parallel for further optimization of all components of the query.

Figure 4:
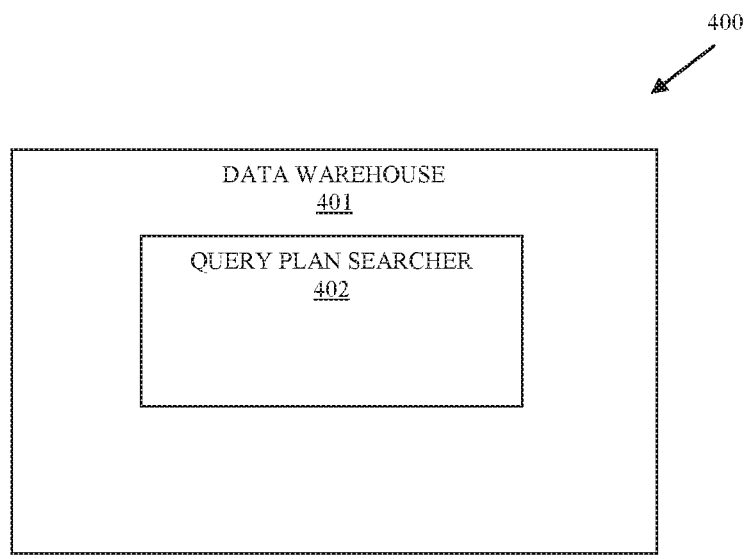
FIG. 4 is a diagram of a system for query plan searching and optimization, according to an example embodiment.

FIG. 4 is a diagram of another system 400 for query plan searching and optimization within a distributed data warehouse, according to an embodiment. The system 400 includes a variety of hardware components and software components. The software components are programmed as executable instructions into memory or a non-transitory computer-readable medium for execution on the hardware components.

The system 400 implements, inter alia, the processing discussed above with the FIGS. 1-3.

The system 400 includes a data warehouse 401. The data warehouse 401 includes a query plan searcher 402.

The query plan searcher 402 is configured to: 1) execute on at least one hardware processor of a network computing device, and 2) identify search spaces having search resources for developing query execution plans for a query, 3) initiate the search resources with the query, 4) receive accumulating plan costs for the query execution plans as the search resources produce the query execution plans, 5) maintain a total resource cost associated with processing the search resources and continued processing of the search resources, and 6) determine when to terminate the processing performed by the search resources and identify a lowest cost execution plan from the query execution plans as an optimal query execution plan based at least in part on the plan costs and the total resource cost.

In an embodiment, the query plan searcher 402 is further configured, in 3), to: vary a total number of the search resources to initiate as parallel threads that process in parallel to one another as a function of: an elapsed time associated with when some of the search resources were first initiated, a total number of the search resources, a current lowest cost query execution plan identified from received ones of the query execution plans, and an estimated query execution time for the query when executed by the current lowest cost query execution plan.

In an embodiment, the query plan searcher 402 is implemented within the optimizer 120.

In an embodiment, the query plan searcher 402 is the method 200.

In an embodiment, the query plan searcher 402 is the method 300.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled

The invention claimed is:

1. A method, comprising:
identifying a search space for a query, the search space including possible query execution plans for executing the query;
subdividing the possible execution plans in the search space among sub search spaces;
using resources to perform a search to obtain plan costs for the query execution plans;
maintaining a resource cost as the search is performed, wherein the resource cost is associated with the cost of using the resources to perform the search so far and the cost of continuing to utilize the resources to complete the search;
normalizing the resource cost into a same unit of measure as that which is associated with the plan costs; and
selecting an optimal execution plan from the query execution plans for which plan costs have been obtained when the resource cost reaches a threshold.

2. The method of claim 1, wherein identifying further includes identifying the search space based on execution characteristics of the query.

3. The method of claim 1, wherein identifying further includes identifying the search space based at least in part on machine learning associated with prior search space identification for prior queries processed.

4. The method of claim 1, wherein identifying further includes removing from the search space any overlap with other search spaces.

5. The method of claim 1, wherein subdividing further includes ordering or prioritizing the subsearch spaces based on criteria that determine a scheduling order for parallel execution of the resources to perform the search.

6. The method of claim 1, wherein subdividing further includes initiating the resources with the query for generation of the query execution plans and obtaining of the plan costs.

7. The method of claim 6, wherein initiating further includes initiating at least some of the resources in parallel threads that generate competing query execution plans or that generate different portions of a same query execution plan.

8. The method of claim 1, wherein selecting further includes terminating processing by the resources and identifying the optimal query execution plan when a total elapsed time for the search is exceeded.

9. The method of claim 1, wherein selecting further includes terminating processing by the resources and identifying the optimal query execution plan based on evaluation of: a total elapsed time for the method processing, a total number of the resources, a current lowest cost query execution plan identified, an estimated time for continued processing by the resources, and user preferences.

10. The method of claim 1, wherein selecting further includes providing a select one of the query execution plans that meets a predefined cost threshold to a database engine for execution while the resources continue to perform the search.

11. A method, comprising:
identifying search resources for processing a query and developing query execution plans for the query;
providing the query to the search resources;
receiving plan costs as the query execution plans are developed by the search resources;
maintaining a resource cost associated with use of and a continued use of the search resources; and
selecting an optimal plan from the query execution plans as a current least cost plan based on the plan costs and the resource cost.

12. The method of claim 11, wherein identifying further includes maintaining sets of the query execution plans as search spaces for acquiring the query execution plans as competing query execution plans.

13. The method of claim 12, wherein providing further includes initiating some of the search resources to determine the costs of query execution plans in separate sets of query execution plans as parallel processing threads.

14. The method of claim 13, wherein initiating further includes identifying a total number of the parallel processing threads for initiation from a user-defined minimum number of threads and a user-defined maximum number of threads.

15. The method of claim 13, wherein initiating further includes varying a total number of parallel processing threads for initiation as a function of a total number of the search resources, a current lowest cost query execution plan, and an estimated query duration time for executing the query with the current lowest cost query execution plan.

16. The method of claim 11, wherein selecting further includes terminating production of the query execution plans and selecting the optimal plan based on an estimated resource cost for the search resources in continuing to produce the query execution plans, an elapsed time that the method has been processing, and a current lowest cost query execution plan identified in produced ones of the query execution plans.

17. The method of claim 11, wherein selecting further includes providing a select portion of one of the query execution plans to a database engine for executing a particular portion of the query while the search resources continue to produce remaining ones of the query execution plans in parallel.

18. A system, comprising:
a data warehouse including:
a query plan searcher;
wherein the query plan searcher is configured to: i) execute on at least one network node of the data warehouse, ii) identify search spaces having search resources for developing query execution plans for a query, iii) initiate the search resources with the query, iv) receive accumulating plan costs for the query execution plans as the search resources produce the query execution plans, v) maintain a total resource cost associated with processing the search resources and continued processing of the search resources, and vi) determine when to terminate the processing performed by the search resources and identify a lowest cost execution plan from the query execution plans as an optimal query execution plan based at least in part on the plan costs and the total resource cost.

19. The system of claim 18, wherein the query plan searcher is further configured in, iii), to: vary a total number of the search resources to initiate as parallel threads that process in parallel to one another as a function of: an elapsed time associated with when some of the search resources were first initiated, a total number of the search resources, a current lowest cost query execution plan identified from received ones of the query execution plans, and an estimated query execution time for the query when executed by the current lowest cost query execution plan.

* * * * *